(12) United States Patent
Daum et al.

(10) Patent No.: US 10,150,671 B2
(45) Date of Patent: Dec. 11, 2018

(54) PROCESS AND PLANT FOR IMPROVED ENERGY-EFFICIENT PRODUCTION OF SULFURIC ACID

(71) Applicant: Outotec (Finland) Oy, Espoo (FI)

(72) Inventors: Karl-Heinz Daum, Limburg (DE); Peter Ernst, Hünstetten (DE); Hannes Storch, Friedrichsdorf (DE); Wolfram Schalk, Bad Homburg (DE)

(73) Assignee: Outotec (Finland) Oy, Espoo (FI)

( * ) Notice: Subject to any disclaimer, the term of this patent is extended or adjusted under 35 U.S.C. 154(b) by 0 days.

(21) Appl. No.: 15/536,234

(22) PCT Filed: Dec. 15, 2015

(86) PCT No.: PCT/EP2015/079809
§ 371 (c)(1),
(2) Date: Jun. 15, 2017

(87) PCT Pub. No.: WO2016/096867
PCT Pub. Date: Jun. 23, 2016

(65) Prior Publication Data
US 2017/0349437 A1    Dec. 7, 2017

(30) Foreign Application Priority Data
Dec. 19, 2014   (DE) .......... 10 2014 119 216

(51) Int. Cl.
*C01B 17/74*  (2006.01)
*C01B 17/76*  (2006.01)
(Continued)

(52) U.S. Cl.
CPC ........ *C01B 17/806* (2013.01); *B01D 53/1406* (2013.01); *B01D 53/1481* (2013.01);
(Continued)

(58) Field of Classification Search
CPC ....... C01B 17/74; C01B 17/76; C01B 17/765; C01B 17/7655; C01B 17/775; C01B 17/80
See application file for complete search history.

(56) References Cited

U.S. PATENT DOCUMENTS 4,996,038 A    2/1991  McAlister et al.
2017/0349437 A1*  12/2017  Daum .................. C01B 17/806

FOREIGN PATENT DOCUMENTS

CH         57886      2/1913
CH        198647     12/1970
(Continued)

OTHER PUBLICATIONS

International Search Report prepared by the European Patent Office for PCT/EP2015/079809, dated Mar. 16, 2016, 5 pages.
(Continued)

*Primary Examiner* — Timothy C Vanoy
(74) *Attorney, Agent, or Firm* — Chernoff Vilhauer LLP (57) ABSTRACT

The invention describes a process for producing sulfuric acid by catalytic oxidation of $SO_2$ to $SO_3$ and subsequent absorption of the $SO_3$ in sulfuric acid, wherein the $SO_3$ is introduced into a first absorption stage (primary absorber) and at least partly absorbed there in concentrated sulfuric acid, wherein the $SO_3$ not absorbed in the first absorption stage is supplied to a second absorption stage (secondary absorber) for the further absorption in concentrated sulfuric acid, and wherein the sulfuric acid is cooled after passing through the two absorption stages. The cooling of the sulfuric acid is effected in at least two heat exchangers connected in parallel, wherein one of the at least two heat exchangers is operated as partial evaporator and is cooled with boiler feed water/steam and the other one is cooled with cooling water and operated as pure acid cooler.

12 Claims, 5 Drawing Sheets

(51) Int. Cl.
    *C01B 17/80*       (2006.01)
    *C01B 17/765*     (2006.01)
    *B01D 53/14*       (2006.01)
    *C01B 17/775*     (2006.01)
    *B01D 53/50*       (2006.01)

(52) U.S. Cl.
    CPC .......... *B01D 53/1493* (2013.01); *C01B 17/76* (2013.01); *C01B 17/7655* (2013.01); *C01B 17/775* (2013.01); *B01D 53/507* (2013.01); *B01D 2252/10* (2013.01); *B01D 2258/025* (2013.01); *B01J 2219/00006* (2013.01); *Y02P 20/124* (2015.11)

(56) References Cited

FOREIGN PATENT DOCUMENTS

| | | | | |
|---|---|---|---|---|
| CH | 547231 | 3/1974 | | |
| DE | 40 19 184 A1 | 1/1991 | | |
| DE | 10 2005 008109 A1 | 8/2006 | | |
| DE | 10 2010 006 541 A1 | 9/2011 | | |
| DE | 102004012293 B4 * | 9/2016 | ............. | C01B 17/76 |
| WO | 2009/065485 A2 | 5/2009 | | |

OTHER PUBLICATIONS

Written Opinion prepared by the European Patent Office for PCT/EP2015/079809, dated Mar. 16, 2016, 6 pages.
International Preliminary Report on Patentability prepared by the European Patent Office for PCT/EP2015/079809, dated Nov. 22, 2016, 16 pages.

\* cited by examiner

PROCESS AND PLANT FOR IMPROVED ENERGY-EFFICIENT PRODUCTION OF SULFURIC ACID

CROSS-REFERENCE TO RELATED APPLICATIONS

This is a national stage application filed under 35 USC 371 based on International Application No. PCT/EP2015/079809 filed Dec. 15, 2015 and claims priority under 35 USC 119 of German Patent Application No. 10 2014 119 216.8 filed Dec. 19, 2014.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

This invention relates to a process and a plant for the production of sulfuric acid by catalytic oxidation of $SO_2$ to $SO_3$ and subsequent absorption of the $SO_3$ in sulfuric acid, wherein the $SO_3$ is introduced into an absorption system, consisting of a first absorption stage (primary absorber) and absorbed there in concentrated sulfuric acid, wherein the non-absorbed $SO_3$ is supplied to a second absorption stage (secondary absorber) for the further absorption in sulfuric acid, and wherein the sulfuric acid is cooled after passing through the two absorption stages.

Sulfuric acid is a chemical compound of sulfur with the chemical formula $H_2SO_4$. It is an oily, very viscous and hygroscopic liquid colorless at room temperature, which is one of the strongest acids and is highly corrosive.

Starting substance for the sulfuric acid production for the most part is elemental sulfur which is obtained in large quantities during the desulfurization or softening of natural gas and crude oil and is produced e.g. by the Claus process. The sulfur thus obtained is burnt with the oxygen present in air, so that sulfur dioxide ($SO_2$) is obtained:

$$S +_2 \rightarrow SO_2$$

By a usually heterogeneous catalysis with a vanadium catalyst, sulfur trioxide ($SO_3$) then is produced from the sulfur dioxide:

$$2SO_2 + O_2 \xrightarrow{Cat} 2SO_3.$$

The sulfur trioxide thus obtained subsequently is converted to sulfuric acid ($H_2SO_4$) by addition of water ($H_2O$), intermediately resulting in the formation of disulfuric acid ($H_2S_2O_7$):

$$SO_3 + H_2SO_4 \rightarrow H_2S_2O_7$$

$$H_2S_2O_7 + H_2O \rightarrow 2H_2SO_4$$

This process does not utilize 100% sulfuric acid, but one with 98-99.6% $H_2SO_4$, depending on the process parameters and the location of the azeotrope. The rest is water.

A further starting substance for the production of sulfuric acid are off-gases from the pyrometallurgical production of non-ferrous metals (e.g. copper, zinc, nickel, lead, molybdenum) from sulfidic ores. The off-gases obtained contain $SO_2$, which then as described above also is catalyzed to $SO_3$ and ultimately is converted to sulfuric acid.

BACKGROUND OF THE INVENTION

CH 49 86 47 describes an apparatus for the absorption of e.g. $SO_3$, which likewise includes two different absorption stages, wherein the one is designed as Venturi absorber and the other one as absorber with ebullient liquid, but without fixed-bed packing. In this configuration it is advantageous that it can be realized such that the sulfuric acid sump at the exit end of the Venturi coincides with the sulfuric acid sump at the bottom of the fixed-bed absorber and thus a common sump exists. The acid then flows in the same flow direction as the $SO_3$ gas to be absorbed.

A similar process is also known from CH 54 72 31, which describes an intermediate absorber for the absorption of $SO_3$. This intermediate absorber consists of a Venturi absorber and a downstream settling space and separating device for the sulfuric acid still contained in the gas.

CH 57 8 86 describes a process for the absorption of $SO_3$ or moisture from gaseous media by means of sulfuric acid, wherein the largest part of the absorption takes place in a first absorption stage in a vertically arranged Venturi absorber in co-current flow between injected sulfuric acid and the gaseous medium. Above the sulfuric acid sump of the Venturi absorber, a connection to a second absorption stage is arranged. The second absorption stage is a vertically arranged tower provided with a packed bed, in which the absorption is effected in counter-current flow in that the gaseous medium is guided from bottom to top and the sulfuric acid is sprayed onto the packing from above and from there trickles down.

In the industrial production of sulfuric acid it is of considerable economic importance that all individual steps are distinctly exothermal, namely the oxidation (combustion) of the sulfur to $SO_2$, the oxidation of $SO_2$ to $SO_3$ (catalytic conversion), the hydration of $SO_3$ with water ($H_2O$) to sulfuric acid ($H_2SO_4$), and its dilution to a technical concentration of e.g. 98.5% $H_2SO_4$. The energy released by these chemical reactions can be used for the production of high-pressure steam and/or low-pressure steam, which then can be utilized for generating electricity, for other process applications or for heating purposes.

Such energy recovery (also heat recovery) must be designed as efficient and comprehensive as possible, in order to convert an optimum of the available heat quantity into steam and thus maximize the economic profitability of a sulfuric acid plant. A large part of the energy (about 60-70%) is available on a sufficiently high temperature level and can be converted directly into high-pressure steam by means of suitable heat exchangers (waste heat boiler, economizer, superheater) in a known way. A smaller part of the energy (about 30-40%) is available on a lower temperature level and therefore can only be +++++ low-pressure steam, and this only incompletely. However, the latter heat recovery and the interconnection of the recovered energy within the plant lead to a considerably increased control and regulation effort. In addition, the heat exchangers for the recovery of heat from the sulfuric acid used for absorption possibly are exposed to a strong corrosion in the sulfuric acid production, namely when the concentration of the sulfuric acid is not optimally maintained (to 98.5-99.8% $H_2SO_4$) and due to the presence of excess water falls below this optimum concentration. This corrosion is increasingly dramatic the further the concentration lies below the optimum.

DE 10 2010 006 541 A1 likewise describes a process for the production of sulfuric acid with a particular focus on the cooling of the acid. When acid which is withdrawn from an absorption apparatus of a sulfuric acid plant, the acid is pumped from the acid pump tank into a heat exchanger for cooling and subsequently again supplied to the absorption apparatus, wherein in the heat exchanger the acid heats water as heat transport medium and at least partly converts it into steam. It is provided that the acid is guided in the tube side of the heat exchanger and the water is guided in the shell side and this water is at least partly converted to steam.

U.S. Pat. No. 4,996,038 describe a process and a plant for heat recovery during the production of sulfuric acid. Sulfur trioxide is absorbed in hot, concentrated sulfuric acid with a concentration between 98 and 101% and a temperature greater than 120° C. The absorption is effected in two stages, a primary and a secondary absorption, wherein both apparatuses are designed as packed bed tower and the $SO_3$-containing gas each is guided in counter-current upward flow to the sulfuric acid which is fed to each packed bed from above. The collected hot acid from both absorption stages, which flows off at the bottom, then is supplied to a heat exchanger in which low-pressure steam is generated.

All processes have in common that in the case of a leakage in a heat exchanger within the heat recovery system, the plant generally must be shut down completely. In addition, the risk of water as coolant mixing with sulfuric acid as medium to be cooled involves considerable risks, so that a particularly fast interruption of the respective leakage is required.

BRIEF SUMMARY OF THE INVENTION

During start-up and shut-down of such plants with heat recovery systems, unstable or transition states can occur, which make it recommendable to initially start the plant in a conventional way and activate the heat recovery only after stabilization of the operation.

When the sulfuric acid plant is part of a larger plant complex such as for example ore roasting or copper smelting with a sulfuric acid production, it is not possible to flexibly respond to energy requirements at other users within the plant complex, as the configuration of the respective heat exchanger defines whether exclusively water, e.g. cooling water, is heated, or steam can be produced as well.

Therefore, it is the objective of the present invention to provide a process with which enables both, heat to be flexibly transmitted to cooling water (e.g. during start-up) and/or low-pressure steam to be generated, and this in different quantity ratios. Furthermore, the safety of the plant thereby is increased and the start-up and shut-down of the plant is facilitated at the same time.

This object is solved by a process with the features of disclosed herein.

Sulfuric acid is produced by catalytic oxidation of $SO_2$ to $SO_3$ and subsequent absorption of the $SO_3$ in sulfuric acid. The $SO_3$ is absorbed in concentrated sulfuric acid in a first absorption stage, the so-called primary absorber, preferably in co-current flow. Due to the partial pressure of the $SO_3$ above the concentrated hot sulfuric acid, a corresponding amount of $SO_3$ remains in the gaseous state. For the further absorption in colder sulfuric acid, the $SO_3$ not absorbed for this reason is supplied to a second absorption stage, preferably designed for counter-current flow, in the so-called secondary absorber.

The $SO_3$-containing gas is passed through the primary absorber and then through the secondary absorber.

After passing through the two absorption stages, the sulfuric acid is collected and cooled. Preferably, the sulfuric acid is fed onto the primary and/or the secondary absorber from above. Preferably, the sulfuric acid is collected centrally.

More preferably, the central collecting takes place in the sump of one of the two absorber or both absorbers feature a common sump. In such an embodiment, the inventive use of two parallel heat exchangers is particularly important since no other way of regulating the temperature is present unlike in a process with two separate acid circuits or a process wherein acid from one sump is directed to the acid feed of the other absorber there is no other way of temperature control. Only two parallel heat exchangers can reliably avoid a heating of the entire system and the risks associated with said disturbances in cases of problems with one of the two heat exchangers Cooling of the circulated heated sulfuric acid according to the invention is effected in two heat exchangers connected in parallel, wherein one of the at least two heat exchangers is designed as evaporator and cooled with boiler feed water, and the other heat exchanger connected in parallel is cooled with cooling water i.e. as pure acid cooler. Thus, part of the sulfuric acid can be cooled down by means of the production of low-pressure steam, while another part is cooled with cooling water and hence only heats the water.

When the plant is operated in the intended heat recovery mode, the entire concentrated sulfuric acid collected is passed through the evaporator and the steam generation thus is maximized. During start-up and shut-down of the plant, i.e. in the cooling mode, this sulfuric acid to be cooled will preferably completely be fed to the acid cooler and thus the heat will be transferred to cooling water.

Depending on the operating requirement, the concentrated sulfuric acid also can be split up between the two heat exchangers in an arbitrary ratio of 0 to 100% and hence e.g. the steam production can be adapted, in order to satisfy possibly temporarily lower take-off demands.

Splitting up the sulfuric acid preferably is effected such that a first part A of the higher concentrated sulfuric acid between 0 and 100 wt-%, preferably 1 to 100 wt % based on the entire stream of sulfuric acid passed through the at least two heat exchangers is introduced into the steam/water-operated heat exchanger (evaporator), and a second part B is introduced into the heat exchanger cooled with cooling water. Preferably, part A lies between 50 and 100 wt-% and part B correspondingly lies between 0 and 50% based on the entire stream of sulfuric acid guided through the at least two heat exchangers.

In a preferred embodiment of the invention, the sulfuric acid addition to the head of the secondary absorber is withdrawn from the circuit of the final absorber. The quantity of this 98.5% $H_2SO_4$ preferably is always kept constant, independent of the plant load and the operating mode, i.e. heat recovery mode or acid cooling mode.

In a further preferred embodiment of the invention, the sulfuric acid addition is guided from the first absorption stage to the second absorption stage. This has the advantage that the entire intermediate absorption system becomes more independent of the operation of the final absorber.

According to the invention, the sulfuric acid can be guided in co-current flow in at least one of the two absorbers, preferably in the primary absorber, which has the advantage that this apparatus can then be designed as Venturi type or as empty tube and thus can be manufactured very economically. Furthermore, the absorption can however also be carried out in counter-current flow in at least one of the two absorbers, preferably in the secondary absorber. This has the advantage that a breakthrough of $SO_3$ at the end of the second absorber practically cannot occur.

More preferably, the first absorber is guided co-current flow. This has the advantage that a more compact design can be realized, whereby the investment costs are reduced significantly. However, a disadvantage is that a larger amount $SO_3$ has to be absorbed in the second absorber, but this is compensated by the lower investment costs.

Furthermore, an admixture of the sump of the second absorber into the feed for sulfuric acid of the first absorber is already in principle disadvantageous since operating faults of the second absorber are transferred to the first absorber, so that there the absorption e.g. is no longer running in the optimal temperature range. Further, as a consequence of the lower absorption rate of the first absorber due to the co-current mode, the second absorber has to be designed larger. In addition, an admixture of the sulfuric acid recycling from the sump of the second absorber into the sulfuric acid feed of the first absorber is not possible anymore but a common sump or a guiding from one sump to the other is needed since due otherwise the larger stream of the second absorber would affect the absorption in the first absorber too much. For safety reasons, however, this is only possible with two parallel heat exchangers. Even the startup and shutdown of the plant is possible only with two parallel heat exchangers due to the large flexibility with respect to the total capacity of the two heat exchangers.

During the absorption of $SO_3$ the concentration of the sulfuric acid flowing off from the two absorbers is increased to >99.0 wt-%, preferably to 99.2-99.8 wt-% $H_2SO_4$. By adding an adequate amount of process water into the circulating acid, the concentration again is adapted such that the same again lies in the optimum range for feeding to the absorption tower tops.

In a particularly preferred embodiment of the invention, the sulfuric acid is adjusted to a sulfuric acid concentration between 98.0 and 99.4 wt-%, preferably >=98.5 wt-%, by admixing water only after passing through the two heat exchangers connected in parallel. This has the advantage that the heat exchangers themselves both are operated with a very high sulfuric acid concentration, preferably greater than 98.5 wt-%, particularly preferably greater than 99.0 wt %, at which the corrosivity of the sulfuric acid is distinctly reduced.

In a particularly preferred embodiment of the invention, the sulfuric acid has an exit temperature between 150 and 210° C. after passing through the evaporator heat exchanger in the heat recovery mode. At this inlet temperature and when maintaining the optimum acid concentration back into the primary absorber, the pipe conduits, pumps and evaporator heat exchangers can be operated without a risk of corrosion. The same applies in the cooling mode, wherein the sulfuric acid has an exit temperature out of the cooler of 60-90° C.

The temperature of the sulfuric acid in the outflow of the two absorbers (=entry to the heat exchangers) lies between 180 and 230° C. according to the invention. At these temperatures and when maintaining the optimum acid concentration, the evaporation cooler can be manufactured of lower-grade stainless steel, without the anodic corrosion protection commonly used in the industry for such application.

The invention furthermore also comprises a plant for carrying out the process according to the invention.

Such plant comprises a primary absorber in which gaseous $SO_3$ and concentrated sulfuric acid are guided in co-current flow, in order to absorb $SO_3$ in the sulfuric acid. Furthermore, such plant also comprises a secondary absorber, preferably guided in counter-current flow, to which the $SO_3$ not absorbed in the primary absorber is supplied for further absorption in sulfuric acid. This supply can be effected in the form of a conduit or by a direct coupling of the two absorbers by a connecting piece in particular also with a common sump. In addition, such plant comprises a recirculation conduit for recirculating the sulfuric acid, wherein sulfuric acid which has passed through both absorbers is recirculated to the inlet of one of the two absorbers.

In such recirculation conduit two heat exchangers connected in parallel are provided according to the invention, one of which is cooled with evaporating water and the other one is cooled with cooling water. This provides for flexibly when a part of the sulfuric acid to be cooled is distributed between the two heat exchangers and thus the operation can react to the demands of steam and heated water. In the case of a leakage in one of the two heat exchangers, the complete stream to be cooled can immediately be redirected into the respective other heat exchanger, so that a shut-down of the entire plant no longer is necessary.

According to the invention, the primary and/or the secondary absorber is designed as fixed-bed absorber. A configuration in which the secondary absorber is designed as fixed-bed absorber has the advantage that the partial pressure of the non-absorbed sulfur trioxide at the outlet of the secondary absorber at 80° C. is less than $3.8*10^{-7}$ bar (at 220° C.:=$2.3*10^{-3}$ bar). As compared to the inlet partial pressure of the gas into the primary absorber, which typically is about 0.1-0.2 bar at about 200° C., a more efficient absorption of the $SO_3$ with a relatively small amount of acid thus takes place here. With an optimized design both of the primary and of the secondary absorber, the amount of acid fed to the secondary absorber can be limited to 1.5-10 $m^3/m^2/h$, preferably to 2-6 $m^3/m^2/h$.

The use of a fixed-bed absorber as primary absorber is recommendable in particular when very large amounts of gas and hence of sulfur trioxide must be absorbed, as other types of absorber, such as a Venturi absorber, lose efficiency when exceeding a certain throughput. To then nevertheless ensure a sufficient absorption capacity, the gas velocity or the throughput of liquid sulfuric acid as absorbent therefore would have to be increased, or several of such absorbers would have to be arranged in parallel, which in turn leads to a higher pressure loss and as a result increased investment and operating costs.

When using fixed-bed absorbers, in particular as primary absorbers the use of large Intalox™ or a structured packing of ceramic material is recommendable, wherein the latter enables higher gas velocities and hence higher specific absorption rates.

According to the invention, the primary and/or the secondary absorber also can be designed as Venturi absorber. In particular in the case of a medium-size performance of the plant of typically 3,000 t/d of $H_2SO_4$ production, here it is possible to absorb a large part of the $SO_3$ already in the primary absorber with only little pressure loss.

What is preferred above all is the combination with a Venturi absorber as primary absorber and a secondary absorber designed as fixed-bed absorber.

In a preferred aspect of the invention, primary and secondary absorber have a common sump and/or a common pump tank, which means that the sulfuric acid used as absorbent accumulates in a region present at the bottom of the two absorbers and depending on the design in a tube connecting the bottoms of the two absorbers.

Particularly advantageously, the common sump also forms the pump tank of that sulfuric acid which subsequently is transferred into the heat exchangers connected in parallel. This offers the advantage that the number of the recirculation pumps, pump tanks and conduits used is reduced distinctly, which not only lowers the investment and operating costs, but also reduces the number of parts susceptible to leakage in the plant, whereby safety is increased. In addition, the common sump offers the advantage that lower heat losses occur here, which is why the heat recovery is more efficient. In particular in combination with the heat recovery according to the invention by means of two heat exchangers connected in parallel, the common sump is recommendable, as it can thus be ensured that by adequate distribution to the two heat exchangers also during start-up of the plant or in partial-load operation, optimum conditions can be adjusted at any point of the process.

It is, however, not only possible to use classical acid pumps as submerged type pumps, but in particular in plants with smaller capacity a directly coupled magnetically operated circulation pump can be used, in which case the separate pump tank then can also be omitted.

Furthermore, in particular in use of a common sump a configuration according to the invention is recommendable, in which all conduits, heat exchangers and other plant components are arranged above the sump, so that when shutting off the plant, the contained sulfuric acid completely flows back into the sump or the pump tank and possibly leaking parts of the plant thus are drained on their own. This also distinctly increases the safety of the plant.

Furthermore, it was found to be preferred to arrange at least one mixing device for the addition of process water in the recirculation piping, with which the concentration of sulfuric acid increased by the absorption of $SO_3$ can again be adjusted to the optimum feed concentration range between 98.5 and 99.4 wt-% $H_2SO_4$, which is particularly suitable for the absorption.

Particularly preferably, at least one mixing device is arranged in flow direction downstream the two heat exchangers, so that the sulfuric acid passes the heat exchangers still in its increased concentration above 99.2-99.8 wt-% $H_2SO_4$. This has the advantage that the heat exchangers susceptible to leakages and particularly at risk in terms of safety due to the use of water as coolant, only are fed by sulfuric acid, which due to its very high concentration has a low corrosivity of considerably below 0.1 mm/year.

Further features, advantages and possible applications of the invention can be taken from the following description of the drawings and the exemplary embodiments. All features described and/or illustrated form the subject-matter of the invention per se or in any combination, independent of their inclusion in the claims or their back-reference.

DETAILED DESCRIPTION OF THE INVENTION

Figure 1:
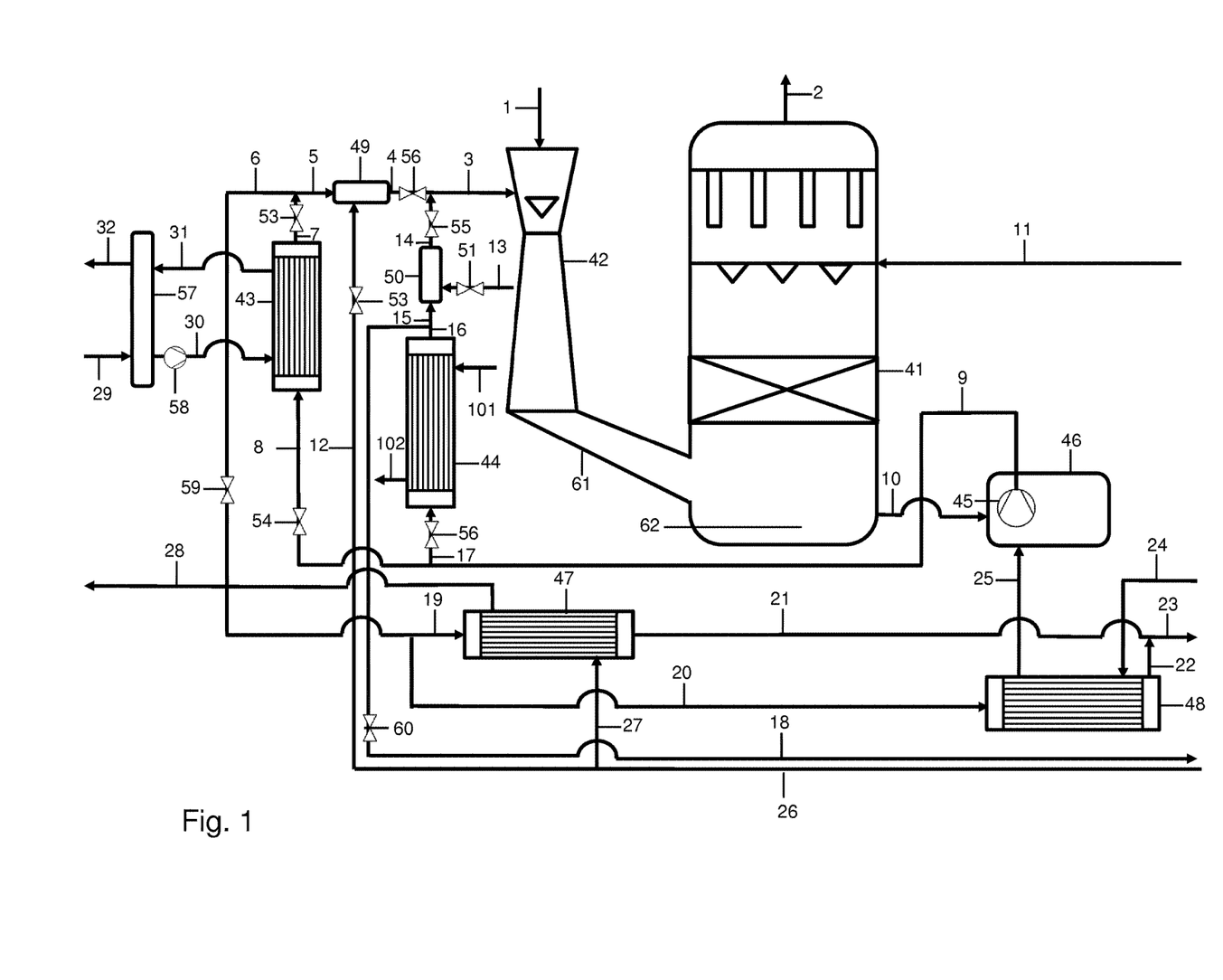
FIG. 1 shows the plant according to the invention with two process water mixing devices for the addition of process water.

FIG. 1 shows the configuration according to the invention. Via conduit 1, gaseous sulfur trioxide is fed into the primary absorber 42 designed as Venturi absorber. Via conduit 3, the absorbent sulfuric acid likewise is added at the head of the primary absorber 42, so that $SO_3$ and sulfuric acid co-currently pass through the primary absorber 42. Via the connection 61, the sulfuric acid concentrated by the absorption flows into the sump 62 of the secondary absorber 41 together with the gas.

Advantageously, the secondary absorber 41 is designed as fixed-bed absorber. The gaseous $SO_3$ introduced via the connection 61 escapes upwards and is absorbed virtually completely in the secondary absorber 41. Remaining $SO_2$ is withdrawn via conduit 2 together with inert gases. Via conduit 11, sulfuric acid additionally is introduced into the head of the secondary absorber 41. The same trickles down into the secondary absorber 41 preferably designed as fixed-bed reactor, so that here $SO_3$ and $H_2SO_4$ are guided in counter-current flow.

Via conduit 10 acid originated from the sump 62, which is composed of the acid discharged in the primary absorber 42 and the acid discharged in the secondary absorber 41, can be discharged into the common pump tank 46. From this pump tank 46, the sulfuric acid is supplied by means of the pump 45 via conduit 9 to two heat exchangers 43 and 44 connected in parallel.

The supply of boiler feed water to the heat exchanger 43 is effected from the steam drum 57 via the circulation pump 58 and conduit 30 into the evaporator heat exchanger 43 cooled with water/steam, with the outlet conduit for the steam/water mixture 31 back to a steam drum 57 in which the steam is separated from water. The steam produced thereby is exported from the plant via conduit 32.

Fresh boiler feed water is supplied to the steam drum 57 via conduit 29. Via conduit 7, the cooled sulfuric acid can then be withdrawn from the heat exchanger 43.

From conduit 7, the cooled acid is delivered via conduit 5 into a mixing device 49, in which via conduit 12 and the flow control valve 52 contained therein, process water is admixed to the acid, in order to adjust the concentration of the acid to a range between 98.0 and 99.4 wt-%. Via conduit 3, the acid diluted in this way then gets back into the primary absorber 42.

Via conduit 6 and the control valve 59 parts of the cooled acid can be supplied to the further heat exchanger 47 via conduit 19 or to the heat exchanger 48 via conduit 20. The cooled acid exiting from the heat exchanger 47 is discharged via conduit 21. The cooled acid exiting from the heat exchanger 48 is discharged via conduit 22. Acid from conduits 21 and 22 is combined and discharged as product via conduit 23.

Alternatively or parallel to the cooling of the circulating acid in the heat exchanger 43, circulating acid to be cooled can be fed via conduit 17 into a second heat exchanger 44 cooled with cooling water with a shut-off or flow control valve 56 provided therein. This heat exchanger 44 includes a corresponding feed conduit 101 and an outlet conduit 102 for the water used as coolant. Via conduit 16, the cooled acid is withdrawn.

Via conduit 15, parts of the hot acid get into a mixing device 50. In this mixing device 50, process water is added to the acid via conduit 13 and the flow control valve 51 provided therein, so that the concentration of the acid is adjusted to values between 98.0 and 99.4%. Acid diluted in this way then is withdrawn via conduit 14.

The conduits 9, 8, 7, 5, 4 and 3 thus form a recirculation line in the heat recovery mode, and the conduits 9, 17, 16, 15, 14 and 3 form a recirculation line in the cooling mode.

Via conduit 27, the heat exchanger 47 is cooled with water originating from conduit 26, which is withdrawn via conduit 28. This water preferably is demineralized water, which ultimately is utilized for steam generation. Via conduit 28, this water preferably is supplied to a non-illustrated thermal water deaerator. In the heat recovery mode, the energy transmitted in the heat exchanger 47 ultimately is taken over as increased steam production for high- and low-pressure steam.

As heat-exchanging medium, sulfuric acid from the drying tower circuit is used in the heat exchanger 48. The same is introduced via conduit 24 and fed into the pump receiver 46 via conduit 25, whereby in the heat recovery mode heat losses due to hot acid flowing off via conduit 6 are minimized and thus an increase in the low-pressure steam quantity is achieved.

The circulating sulfuric acid for the primary absorption can be cooled completely or in part in each of the heat exchangers 43 or 44. For distributing the acid on the two heat exchangers, shut-off or control valves 54 and 53 or 56 and 55 respectively are provided before and after these heat exchangers. The adaptation to the respective demands, such as e.g. reduced export of low-pressure steam, can be performed during the operation.

In the pure acid cooling mode, a part of the circulating acid is withdrawn via conduit 18 by means of the control valve 60 and discharged as product.

Figure 2:
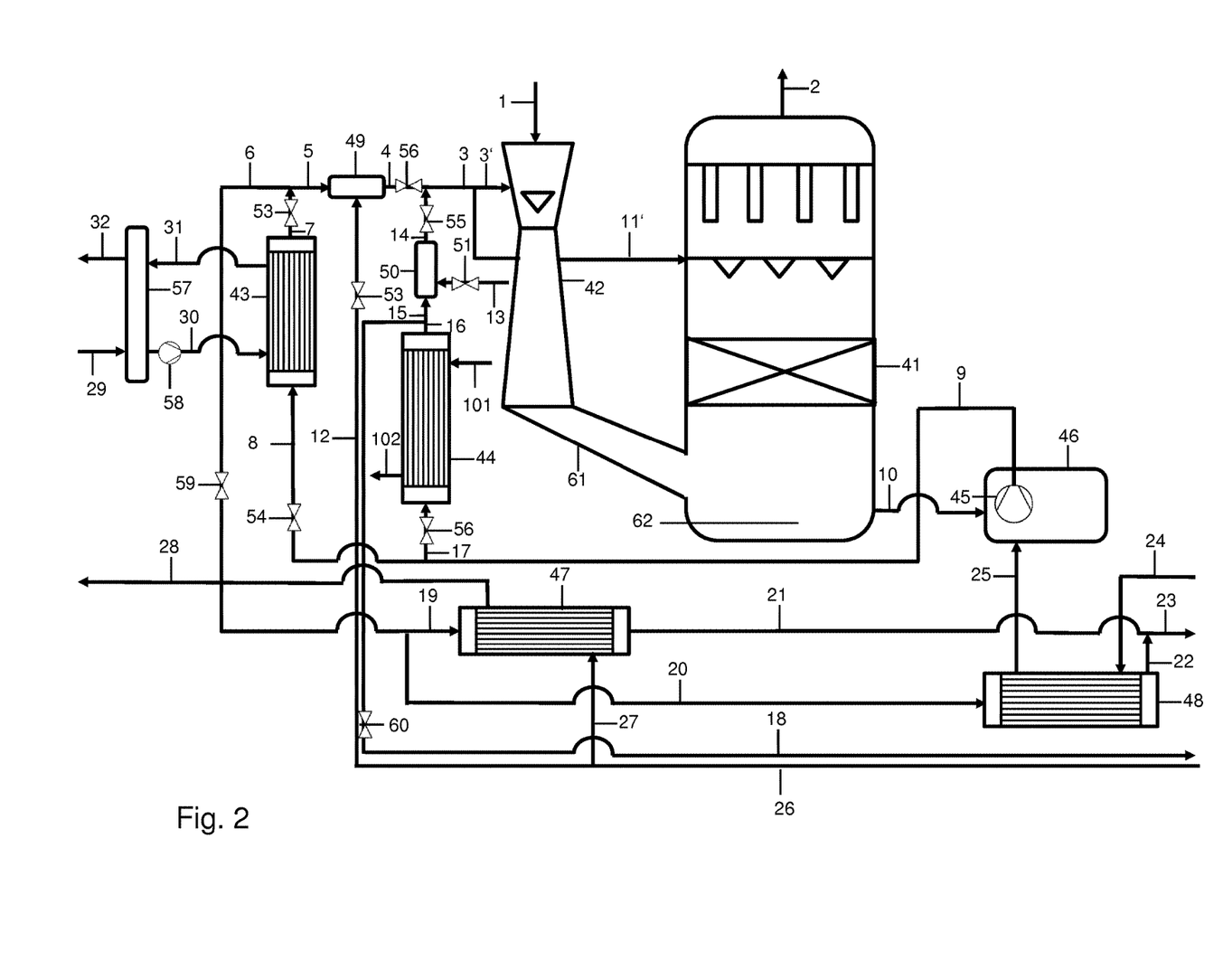
FIG. 2 shows the plant according to the invention with direct addition of acid from the first into the second absorber.

FIG. 2 likewise shows a configuration according to the invention. However, a conduit 11a is branched off here from conduit 3, which likewise feeds sulfuric acid as absorbent into the secondary absorber 41, so that the fresh sulfuric acid stream 11 can be reduced or entirely be set to zero.

This offers the advantage that in such configuration the supply of sulfuric acid from the final absorber circuit can be avoided and thus a decoupling of intermediate and final absorption takes place.

Figure 3:
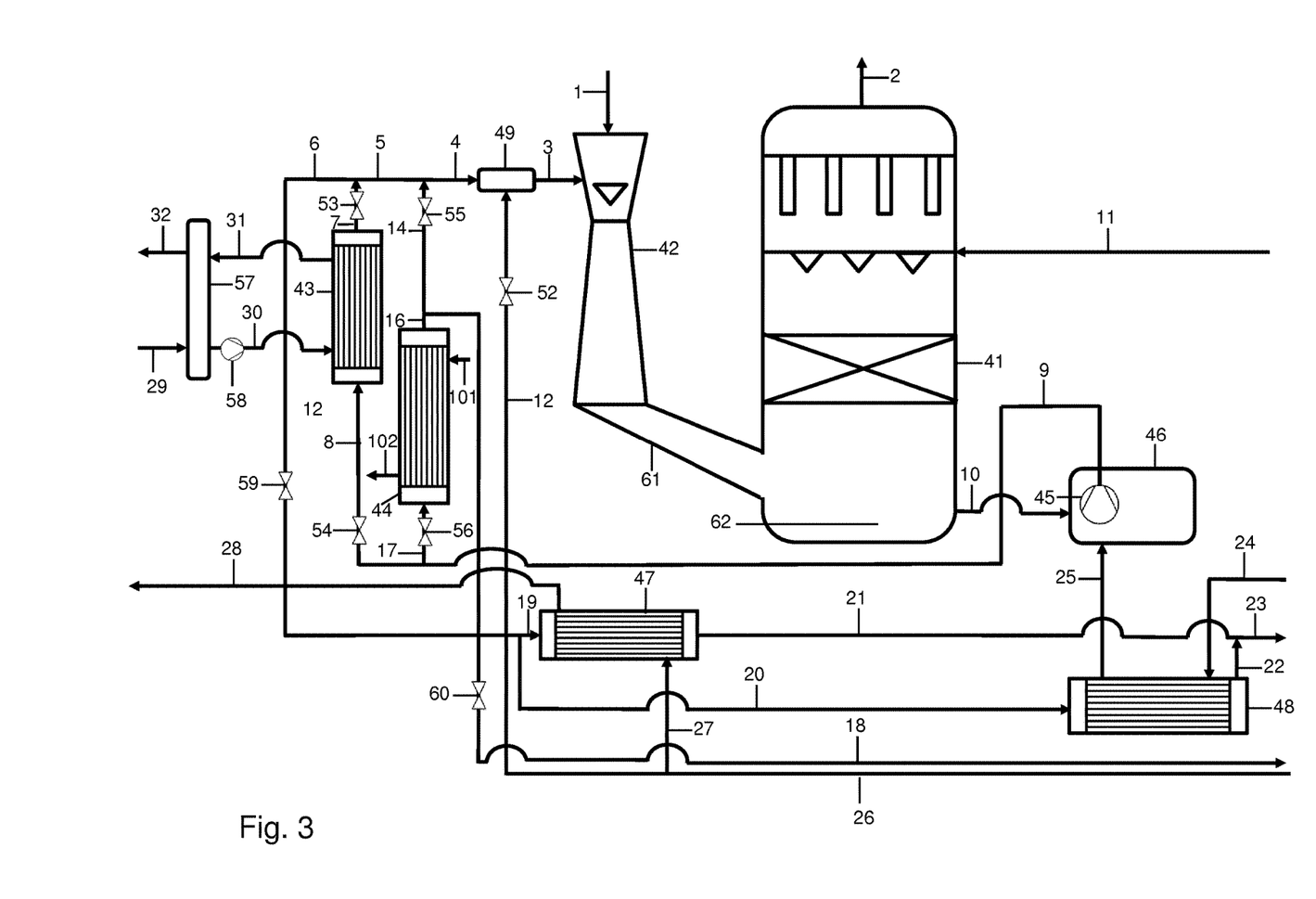
FIG. 3 shows the plant according to the invention with a single process water mixing device.

FIG. 3 furthermore shows a configuration of the plant according to the invention in which a single process water mixing device 49 is used. From both, the first heat exchanger 43 operated as evaporator the correspondingly cooled sulfuric acid is supplied via conduit 7 and the flow control valve 53 contained therein as well as the sulfuric acid from the second heat exchanger 44 operated with cooling water is supplied via conduit 14 to the single mixing device 49, from which the correspondingly diluted sulfuric acid is directly introduced into the primary absorber 42 via conduit 3. The required process water is supplied to the process water mixing device 49 via conduit 12 and the control valve 52.

Figure 4:
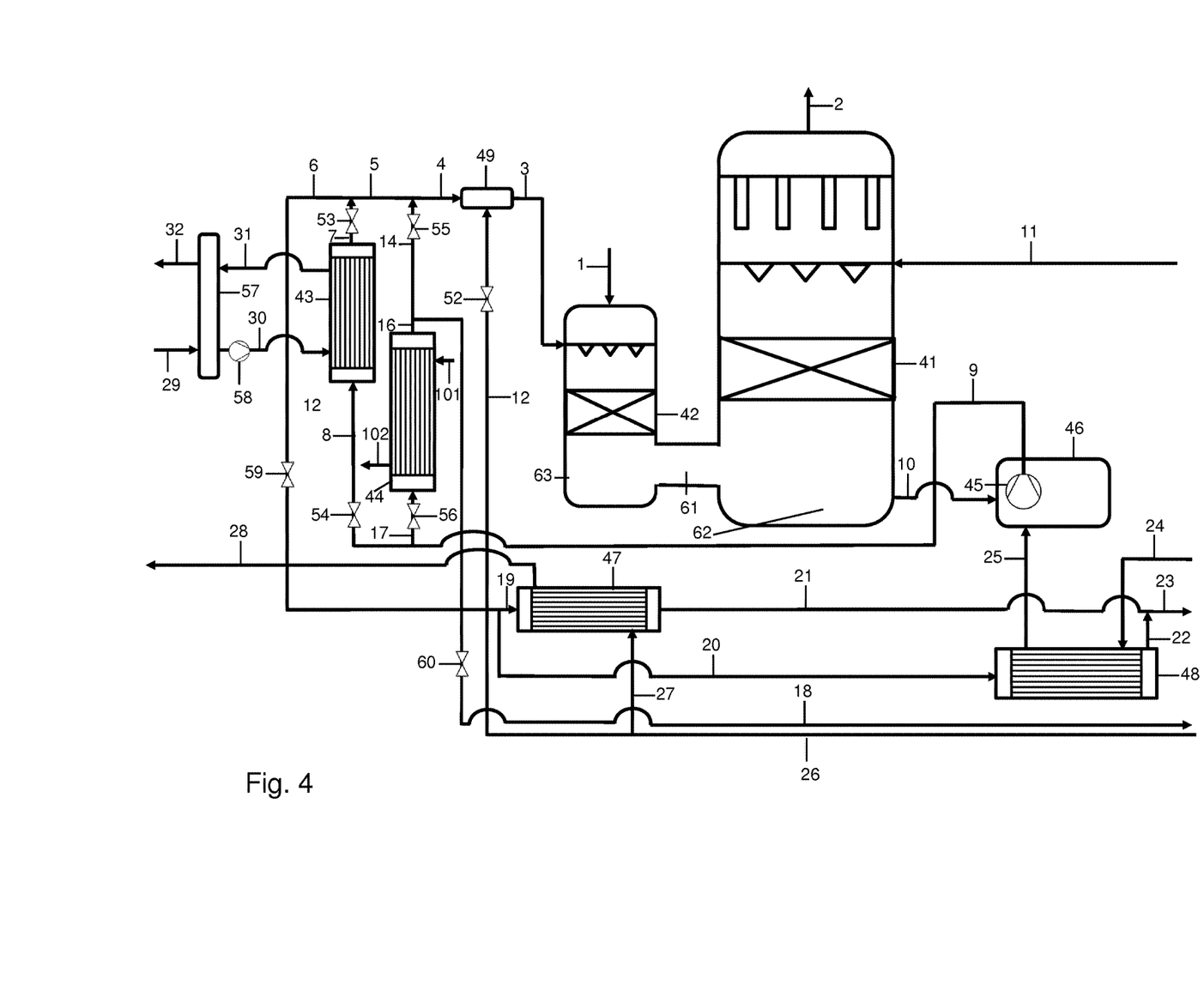
FIG. 4 shows the plant according to the invention with the primary absorber designed as packed bed absorber.

FIG. 4 shows the design of the primary absorber 42 as packed bed absorber, wherein the mode of function basically is identical to the representation of FIG. 3. The collected acid from the outlets of the primary and secondary absorbers can be collected both in the sump 63 of the primary absorber as well as in the sump 62 of the secondary absorber. The outflow via conduit 10 into the pump tank 46 can be effected both from the sump 63 and in a manner not shown here, or from the sump 62. The channel 61 serves as level equalizer. This allows an optimum adaptation of the pump tank 46 to possibly existing restrictions regarding space conditions.

Figure 5:
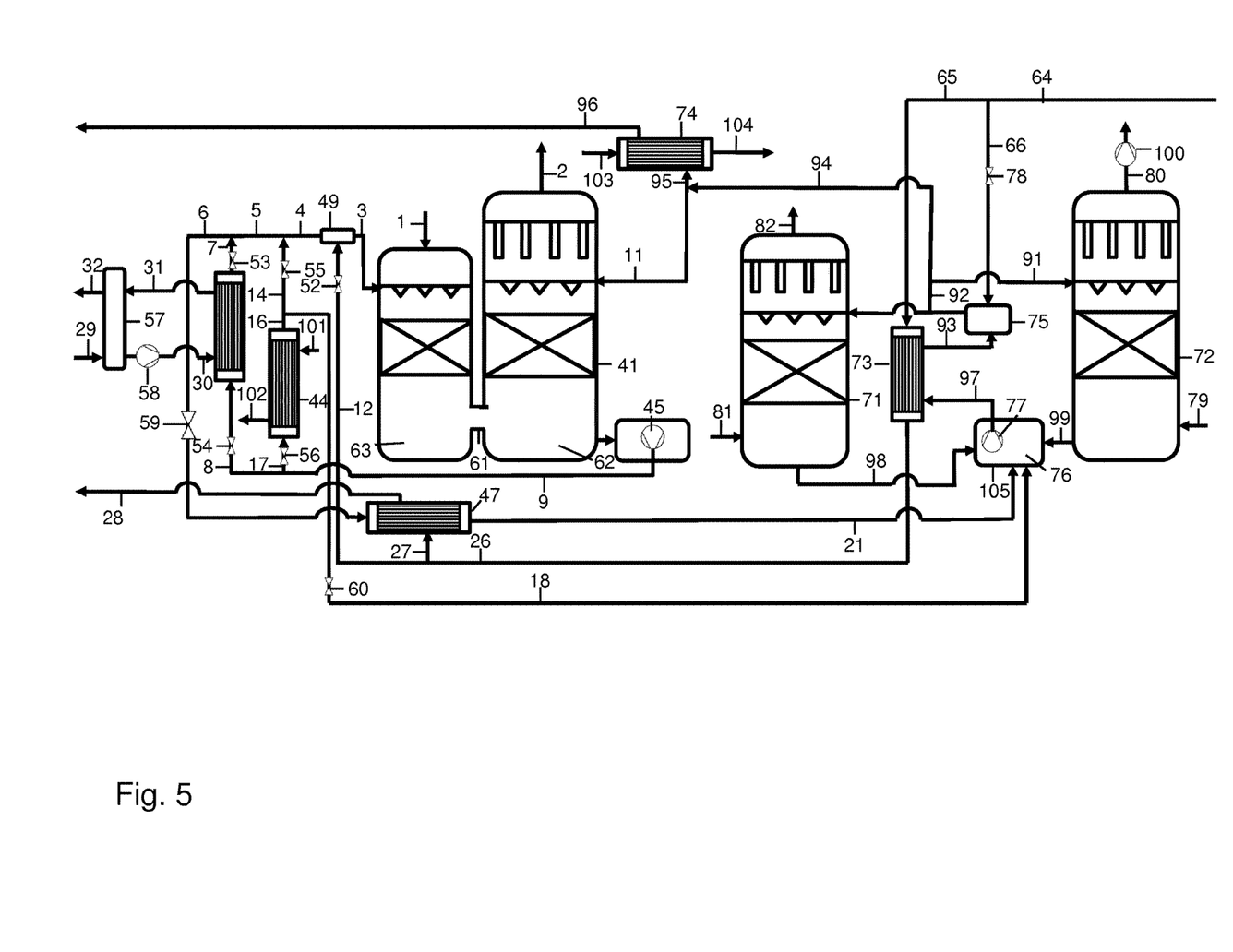
FIG. 5 shows the plant according to the invention in the entire sulfuric acid plant, i.e. with representation of the drying tower and final absorber and their acid circuits.

FIG. 5 finally shows the process according to the invention in a particular configuration in connection with the entire acid plant process, wherein the gas entering the drying tower 72 must not exceed a particular water content/moisture. Via conduit 1, $SO_3$ to be absorbed is introduced into the primary absorber 42, where it is absorbed by the sulfuric acid supplied via conduit 3. Via a gas conduit 61, a mixture of gas and sulfuric acid is guided into the sump 62 of the secondary absorber 41. Via conduit 11, this secondary absorber is supplied with sulfuric acid from the circuit of the final absorber 71.

Via conduit 81, the residual $SO_2$ converted to $SO_3$ in the second catalytic stage is supplied to the final absorber 71 designed as packed bed absorber, and absorbed there in sulfuric acid. Contained inert gases escape from the final absorber 71 to a stack via conduit 82.

Via conduit 79, ambient air or $SO_2$-containing process gas is guided into a drying tower 72 designed as packed absorber and leaves the same via conduit 80 to the blower 100 which conveys the gas through the entire plant. The moisture contained in this gas stream of conduit 79 is absorbed in circulating sulfuric acid.

Via conduit 21, the production from the intermediate absorber system, consisting of primary absorber 42 and secondary absorber 41 gets into a pump tank 76 of the common acid circuit for the final absorber 71 and the drying tower 72. Via conduit 98 the concentrated acid flowing off from the final absorber 71 and via conduit 99 the diluted acid flowing off from the drying tower 72 are also fed to the pump tank 76. The mixture of these two acid streams in conduit 97 still has a concentration which lies above 98.5 wt-% and therefore must again be brought to the required concentration by means of process water addition.

For this purpose, the acid from the pump tank 76 is fed to an acid cooler 73 by means of the pump 77 via conduit 97 and after cooling enters into a process water mixing device 75 via conduit 93, in which mixing device the acid concentration is adjusted to 98.5 wt. % of $H_2SO_4$. For this purpose, process water is supplied to the process water mixing device 75 via conduit 66 with the control valve 78.

Here as well, the increased acid concentration to which the acid cooler 73 is exposed has an advantageous effect on the corrosion behavior of the cooler 73 as well as of the pump 77 and the connected acid conduits 93, 26, 27 and 12.

Preferably demineralized water for steam generation is introduced into the plant via conduit 64 and split up into the streams of conduit 65 and conduit 66. Via conduit 65, this cold water flows to the acid cooler 73, where it absorbs energy from the acid cooling. Via conduit 26, the water heated in this way is then introduced into the heat exchanger 47 for further heating.

The acid from conduit 92, which exits from a process water mixing device 75, is split up into three partial streams 90, 91 and 94. One partial stream is guided onto the head of the end absorber 71 via conduit 90, another partial stream is guided onto the head of the drying tower 72 via conduit 91, and via conduit 94 a third partial stream is guided as production with conduit 95 and as cross-flow to the secondary absorber with conduit 11.

The acid produced in the primary and secondary absorber is supplied to the circuit of end absorber and drying tower via conduit 21 and combined with the acid formed in the system of end absorber and drying tower and ultimately via conduit 95 is jointly introduced into a product cooler 74 as export product acid of the plant. After cooling by means of cooling water, the product acid is exported from the plant via conduit 96. Cooling water enters into the product cooler 74 via conduit 103 and leaves the cooler via conduit 104.

LIST OF REFERENCE NUMERALS 1-2 conduit
3-32 conduit
41 secondary absorber
42 primary absorber
43 heat exchanger operated with steam/water
44 heat exchanger operated with cooling water
45 pump
46 pump tank
47 heat exchanger
48 heat exchanger
49 process water mixing device
50 process water mixing device
51-52 flow control valve
53-56 flow control valve
57 steam drum
58 pump
61 connection
62 sump
64-66 conduit
71 final absorber
72 drying tower
73-74 heat exchanger
75 process water mixing device
78 flow control valve
76 pump tank
77 pump
79-82 conduit
90-99 conduit
100 blower
101-104 conduit

The invention claimed is:

1. A process for producing sulfuric acid by catalytic oxidation of $SO_2$ to $SO_3$ and subsequent absorption of the $SO_3$ in sulfuric acid,
    wherein the $SO_3$ is introduced into a first absorption stage (primary absorber) and at least partly absorbed there in concentrated sulfuric acid,
    wherein the $SO_3$ not absorbed in the first absorption stage is supplied to a second absorption stage (secondary absorber) for the further absorption in concentrated sulfuric acid, and
    wherein the sulfuric acid is cooled after passing through the two absorption stages,
    wherein cooling of the sulfuric acid is effected in at least two heat exchangers connected in parallel,
    wherein one of the at least two heat exchangers is operated as partial evaporator and is cooled with boiler feed water/steam and the other one is cooled with cooling water and operated as pure acid cooler,
    wherein the outflowing sulfuric acid is guided from the first absorption stage to the sump of the second absorption stage or that the outflowing sulfuric acid is guided from the second absorption stage to the sump of the first absorption stage or that the sulfuric acid runs into a common sump and/or a common pump tank of the two absorbers,
    characterized in that in the primary absorber the sulfuric acid is guided in co-current flow to the $SO_3$ containing gas and
    that in the second absorber the sulfuric acid is guided in counter-current flow to the $SO_3$ containing gas.

2. The process according to claim 1, characterized in that in the heat exchanger cooled with boiler feed water/steam a first part (A) of 0-100% of the entire heat quantity is cooled, and in the heat exchanger cooled with cooling water a second remaining part (B) of 100-0% is cooled.

3. The process according to claim 1, characterized in that the concentration of the sulfuric acid after cooling in the two parallel arranged heat exchangers is adjusted to a value between 98.0 and 99.4 wt % by admixing process water.

4. The process according to claim 1, characterized in that the concentration of the sulfuric acid which is fed to the primary absorber is higher than the concentration of the sulfuric acid which is fed to the secondary absorber.

5. The process according to claim 1, characterized in that the exit temperature of the sulfuric acid downstream the heat exchanger cooled with cooling water lies between 60 and 90° C.

6. The process according to claim 1, characterized in that the exit temperature of the sulfuric acid downstream the heat exchanger cooled with boiler feed water/steam lies between 150 and 230° C.

7. A plant for producing sulfuric acid by catalytic oxidation of $SO_2$ to $SO_3$ and subsequent absorption of the $SO_3$ in sulfuric acid, comprising
    a primary absorber to which gaseous $SO_3$ and concentrated sulfuric acid are supplied, in order to absorb $SO_3$ in the sulfuric acid,
    a secondary absorber to which the $SO_3$ not absorbed in the primary absorber is supplied for the further absorption in sulfuric acid,
    and at least one recirculation conduit for recirculating the sulfuric acid from a sump of the two absorbers into the head of the primary absorber,
    at least two heat exchangers connected in parallel in the at least one recirculation conduit, one of which is designed for cooling with boiler feed water/steam and the other one is designed for cooling with cooling water and by a connection connecting the sumps of the primary and the secondary absorber or a common sump and/or a common pump tank of the primary absorber and the secondary absorber,
    characterized in that in the primary absorber is designed for guiding the sulfuric acid in co-current flow to the $SO_3$ containing gas and
    that in the second absorber is designed for guiding the sulfuric acid in counter-current flow to the $SO_3$ containing gas.

8. The plant according to claim 7, characterized in that the primary absorber and/or the secondary absorber is/are designed as fixed-bed absorber(s).

9. The plant according to claim 7, characterized in that the primary absorber and/or the secondary absorber is/are designed as Venturi absorber(s).

10. The plant according to claim 7, characterized in that in the at least one recirculation conduit at least one process water mixing device is arranged for the addition of water.

11. The plant according to claim 10, characterized in that the at least one process water mixing device is arranged in flow direction downstream the two heat exchangers.

12. The plant according to claim 10, characterized in that at least one conduit is branched off after the at least one process water mixing device, through which the sulphuric acid is passed in the secondary absorber directly.

* * * * *

UNITED STATES PATENT AND TRADEMARK OFFICE
CERTIFICATE OF CORRECTION

PATENT NO. : 10,150,671 B2
APPLICATION NO. : 15/536234
DATED : December 11, 2018
INVENTOR(S) : Karl-Heinz Daum et al.

It is certified that error appears in the above-identified patent and that said Letters Patent is hereby corrected as shown below:

In the Specification

Column 1, Line 58 "$S+_2 \to SO_2$" should be -- $S+O_2 \to SO_2$ --

Signed and Sealed this
Twenty-second Day of January, 2019

Andrei Iancu
*Director of the United States Patent and Trademark Office*